UNITED STATES PATENT OFFICE.

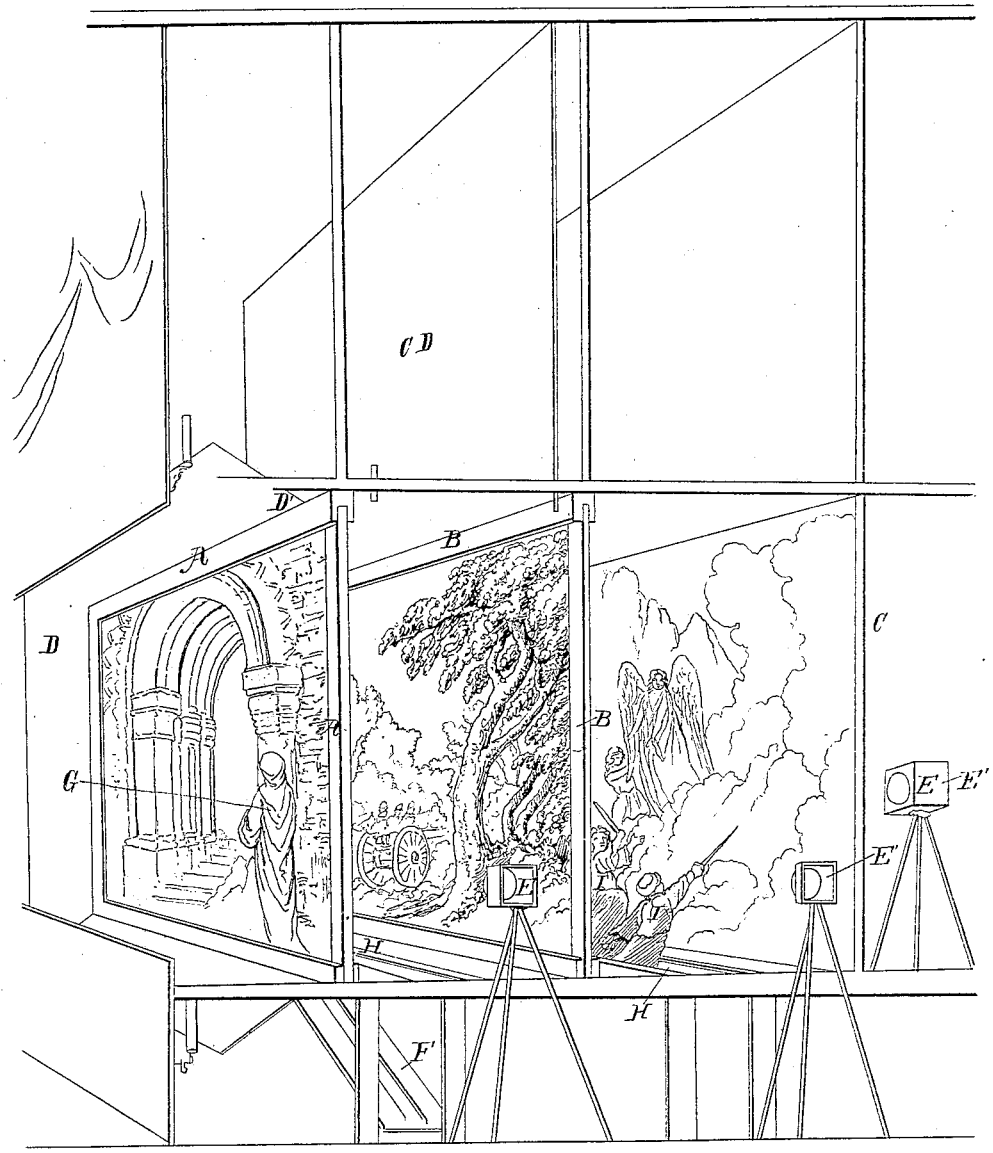

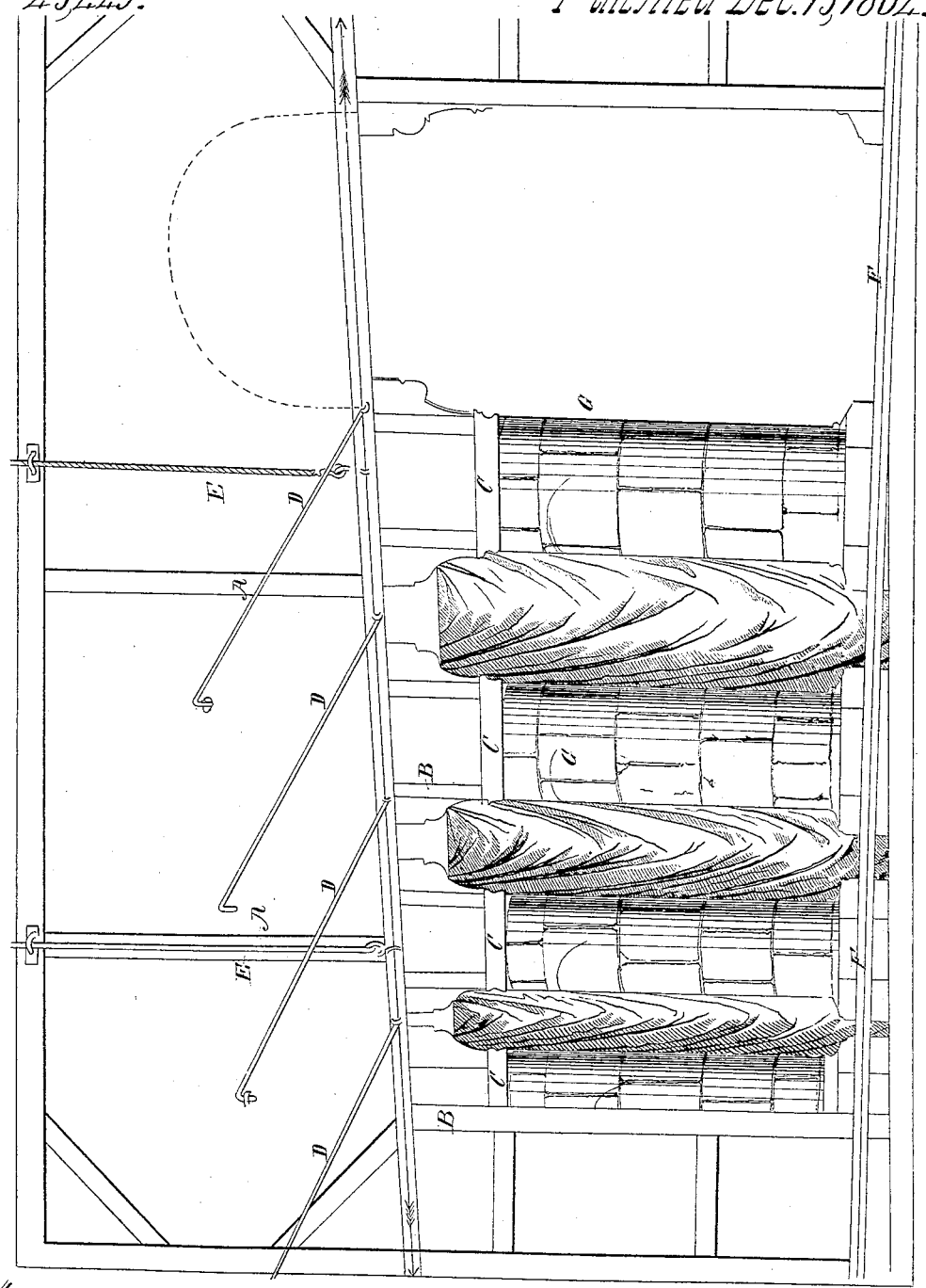

WILLIAM CALLCOTT, OF LONDON, ENGLAND.

APPARATUS FOR PRODUCING SCENIC EFFECTS.

Specification forming part of Letters Patent No. 45,449, dated December 13, 1864.

*To all whom it may concern:*

Be it known that I, WILLIAM CALLCOTT, of Park Village, East Regents Park, London, scenic artist, have invented Improved Means or Apparatus for Producing Scenic Effects; and I do hereby declare the following is a full and exact description thereof, reference being had to the accompanying drawings and to the letters of reference marked thereon.

Hitherto the ordinary means adopted to produce visionary effects on the stage of theaters and other places of exhibition is by painting certain portions of the scenery on Scotch gauze or net. An opening is cut in the scene and said gauze or net is attached and covers the opening. This is backed by a working-cloth or piece of scenery, and by reducing the the light in front of the scene and increasing the light behind the gauze the painting on the gauze becomes invisible, disclosing whatever may be the vision or apparition. Sometimes an entire form is made in outline of wire-work and then covered with gauze or net, afterward painted in clouds or otherwise, as required; and latterly a wire-gauze, resembling the mesh of Scotch gauze, has been introduced. The methods hitherto adopted have produced semi-opaque effect by what has been shown vanishing more or less.

The object of my invention is to produce the effect of a vision apparent through whatever may be painted on the scene or on several scenes at once, and, if required, without reducing the light in front of the scenery to anything like the extent hitherto compulsorily practiced, the colors of the painting remaining palpable throughout, the vision being seen through these colors, and partaking, as in the case of an armed figure, in so far as the difference of light will permit of, the colors past which the vision will be made to walk or glide; and to effect my purpose I use all the ordinary appliances of the stage for lifting, moving, piecing, or setting my tableaux, the combination for which I ask protection being that of a sheet or sheets of glass painted in transparent colors to represent any scene or scenery, whether forest, wall, drapery, or other such sheet or sheets of painted glass being covered in front by the net-work known as "Italian net" or other net-work, (also painted,) and having at its or their back a light backing—such as white linen or cotton—which is also transparent.

It will be at once understood that the scenes and visions which may be produced by this combination are innumerable, but to give a full idea thereof I instance two—say: First, the ghost scene in the play of Hamlet. The scene is set with glass, in one piece or in as many pieces as may be convenient, painted, prepared, and combined with net and backing, as aforesaid, and representing tapestry columns and other architecture. The ghost (nevertheless a real personage) enters covered by the ray of a lime or other light, plain or of any color, (using or not a graduated-color glass in front of the lens,) and as it passes along and behind the scene (which is illuminated at its back in the ordinary or any effective manner) it takes on its armor the various colors of the tapestry and columns, the effect being that the ghost not only appears to pass through the solid column and thick tapestry, but actually assumes a shade of color corresponding with that of the column as it appears to pass through it, and a shade similar to that of the tapestry as it passes from the column, and so on until it disappears or actually walks through the scene onto the stage. Secondly, say for a diorama, several sheets of glass (in this instance we will suppose two) are used and may be painted with designs covering or partially covering them—say, first design, an interior; second design, a battle-field; third design, on linen, a vision of an angel descending. Now, supposing a lady or lay figure reclining in front of the first scene, and that this lady is dreaming of her absent husband, a knight gone to the wars. She sees a figure, which may also be a real personage or an automaton, appear with colored light (lime or other) on its form, indistinct, and as though it appeared through the walls. A gauze-screen works up between the first and second glass, discovering a battle-field by means of strong light (gas) thrown on linen at back. Sundry figures, real or otherwise, are seen fighting, and then back or third picture becomes transparent and is seen through the two first pictures, the distance between the plates or sheets of glass to be regulated by their size, the capacity of the stage, or at the will of the artist.

In the accompanying drawings, Sheet 1 represents a back view of a plan of construction or portion of a set scene suitable for the appearance of the ghost in Hamlet, as aforesaid. A A represent frame scenery down to the arrows, separate or together, with B B, also framed scenery with grooves at $c$ $c$ $c$ $c$. In these grooves are plates of glass painted transparent, as columns and tapestry. In this drawing D shows iron rods with hooks to brace up scene let into a back framed scene. When in place, E, ropes to take up the whole or part of scene, at option of the machinist; F, raking slote for figure to work down onto stage; G, plate or other glass, in squares of convenient size, having tapestry and columns for this scene, or trees, water, or other scenery painted thereon, according to the subject to be represented. Lime or other light is thrown upon the figure. This figure may be a person, an effigy, or a piece of glass painted transparent, as figure as it descends the slote.

Sheet 2 represents the introduction of figures, living or unreal, into dissolving pictures, and the application of glass painted and applied in combination with and forming a portion of framed scenery, the effect of a passing picture seen through another picture in combination with living or artificial figures, or no figures, and graduated colored lights. A B represent frames with scenic design painted in transparent colors (entirely over or in part only) on glass, at the option of the artist, or should the proportions be extremely large it will be necessary to have a margin of framed scenery covered with canvas and blended into the transparent portions; C, frame covered with fine linen (the painting is transparent, and the painting is from, not toward, the audience.) In the drawings it is represented as when illuminated. C D is a sheet of fine net or gauze, on frame, or otherwise; to move up, or otherwise—say laterally; D, the frame-work supporting the stage or platform and upper work; D D,' the opening or proscenium; E, lime lights, with a graduated colored glass in front of lens; E E', lime light at back to illumine transparency. These lights are on stands, or may be held in position. F is mechanism, which may be slote, slide, or any other ordinary methods for working figures on scenery. These are as many as the figures to be moved may require. G is a figure working-up mechanism. H H, openings on stage for figures to appear through. The grooves can be of any length to allow glass in frames to work off, if wanted. This scenic effect is worked as follows: The scene at first represents an interior. The figure G appears gradually with colored light on its form, and produces an effect of indistinctness, as though it appeared through walls and melted away afterward. The gauze C D works up and shows a battle-field by means of a strong light thrown on design at back, and I I figures, as in battle, appear, the back picture becoming transparent, and is seen through the two first pictures.

What I claim as my invention is—

The combination of a sheet or sheets of glass painted in transparent colors, covered in front with painted net-work and having a light backing, as hereinbefore described.

WILLIAM CALLCOTT.

Witnesses:
W. E. GEDGE,
JOHN GEDGE,
*Both of* 11 *Wellington Street,*
*Strand, London.*